(12) United States Patent
Bauhofer et al.

(10) Patent No.: US 7,150,016 B2
(45) Date of Patent: Dec. 12, 2006

(54) SYSTEMS, METHODS AND COMPUTER PROGRAM PRODUCTS FOR CONTROLLING AND VISUALIZING PROCESSES

(75) Inventors: Andreas Bauhofer, Egglham (DE); Heidemarie Meyerhofer, Ortenburg (DE); Roland Mandl, Ortenburg (DE)

(73) Assignee: Micro-Epsilon Messtechnik GmbH & Co. KG, Ortenburg (DE)

( * ) Notice: Subject to any disclaimer, the term of this patent is extended or adjusted under 35 U.S.C. 154(b) by 659 days.

(21) Appl. No.: 09/861,876

(22) Filed: May 21, 2001

(65) Prior Publication Data

US 2002/0004811 A1    Jan. 10, 2002

(30) Foreign Application Priority Data

May 19, 2000  (DE)  .................................. 100 24 409
Apr. 23, 2001 (DE)  .................................. 101 20 005

(51) Int. Cl.
*G06F 9/46*   (2006.01)

(52) U.S. Cl. ..................... 718/100; 718/102; 718/104; 718/107; 710/200

(58) Field of Classification Search ........ 711/117–119, 711/147–148, 150, 152, 167; 710/200; 718/100, 718/102, 104, 107

See application file for complete search history.

(56) References Cited

U.S. PATENT DOCUMENTS

| | | | | |
|---|---|---|---|---|
| 5,715,447 | A  * | 2/1998 | Hayashi et al. | 707/8 |
| 6,260,143 | B1 * | 7/2001 | deCarmo | 713/165 |
| 6,272,437 | B1 * | 8/2001 | Woods et al. | 702/35 |
| 6,295,557 | B1 * | 9/2001 | Foss et al. | 709/224 |
| 6,665,704 | B1 * | 12/2003 | Singh | 709/203 |
| 6,704,799 | B1 * | 3/2004 | Kindorf et al. | 719/312 |
| 2001/0013090 | A1 * | 8/2001 | Sandstrom | 711/147 |

OTHER PUBLICATIONS

Carter et al. "Techniques for Reducing Consistency-Related Communication in Distributed Shared-Memory Systems", ACM Transactions on Computer Systems, vol. 13 Issue 3 (Aug. 1995).*
Nehmer et al., Systemsoftware: Grundlagen moderner Betriebssysteme, 1$^{st}$ edition, Heidelberg: dpunkt-Verl., 1998 (dpunkt text book), ISBN 3-9209993-74-8.

* cited by examiner

*Primary Examiner*—Thomas Lee
*Assistant Examiner*—Sean Weinman
(74) *Attorney, Agent, or Firm*—Alston & Bird LLP

(57) ABSTRACT

A method of controlling and visualizing processes, wherein data are produced by means of at least one task and/or thread, and consumed by means of at least one further task and/or thread, is designed with respect to a deterministic behavior without increased costs for software or hardware such that a decoupling of mutually blocking tasks and/or threads occurs in real time systems.

7 Claims, 4 Drawing Sheets

T1    →    M1    →    T2

Time axis
↓

T1 with D
    ECS
        M1 = D
    LCS

T2 wants to process M1
    ECS
T2 processes M1
    LCS
        T2 is finished

T1 → M1 → M2 → T2

Time axis
↓

T1 with D
  ↘ ECS
    If M1 = ∅ → M1 = D
  or
    If M1 <> ∅ → M1 = M1 + D
  ↙ LCS T2 wants to process M2
                ↙ ECS
        M2 = M1
           ↓
        M1 = ∅
              ↘ LCS
                T2 processes M2

Time axis
↓

T1 with D
ECS
M1=D
LCS

T2 wants to process M2
ECS
M2=M1
LCS
T2 processes M2

T3 with D'
ECS
M1=D'
LCS

T1 transfers M1

SYSTEMS, METHODS AND COMPUTER PROGRAM PRODUCTS FOR CONTROLLING AND VISUALIZING PROCESSES

FIELD OF THE INVENTION

The present invention relates to systems, methods, and computer program products for controlling and visualizing processes, wherein data is produced by means of at least one of a task and a thread and wherein data is consumed by means of at least one of a further task and a thread.

BACKGROUND OF THE INVENTION

Methods of controlling and visualizing processes have been known in practice for a long time. In general, they are software systems that are used for controlling physical processes. In the case of these software systems, it is necessary to guarantee a deterministic behavior as regards the cycle time of the sampling of signals for purposes of keeping dead times of the closed loop system small and constant. The often desired, simultaneous visualization or saving of controlled variables complicates this undertaking, since system resources, such as the display screen, hard disk, or the like of a computer can only be used exclusively, i.e., by only one system resource, at any given time.

There exist so-called multitasking operating systems, which are capable of handling several tasks, i.e., functions, at the same time. In addition, there exist so-called multithreading operating systems, wherein the individual tasks are divided into so-called threads. A thread is understood as the control flow that is inherent in the process of a program. Multitasking and multithreading operating systems are of special advantage, since in the process of executing commands, for example, the CPU of a computer must over and over again await the response from, for example, programs or peripheral devices. The CPU is able to assign this turnaround time as computing time to other processes by means of multitasking or multithreading. Consequently, the execution of individual commands of the different programs does not occur in parallel, but in so-called time windows or even time slices, since the CPU can execute only one command at the same time. A so-called scheduler, an integral part of the operating system, which allocates priorities to the individual tasks or threads, undertakes to set the sequence of the execution. However, such an operating system involves at any time the risk that the tasks or threads are blocked, when an output is attempted, since other tasks or threads tie up the output. This blocking stops the outputting task or thread, until the already started tasks or threads of other processes of the same or a higher priority are completed. In this process, for example, a closed loop control system is also blocked. Such a blocking is unacceptable for a real control, which goes beyond a simulation of the closed loop control system.

In general, these problems are solved by a special hardware with dual-ported, shared-memory components. As a result of the largely decoupled access to the memory in terms of time, a blocking of a thread with a high priority, for example, the thread of control will not occur. A mere software solution, however, is not possible in this way, which will inevitably lead to higher costs by the additionally used hardware.

In the case of a mere software-type solution, the transfer of data between tasks or threads is synchronized by means of so-called semaphores. The semaphores are used to manage many system resources of a computer, such as the display screen, hard disk, or the like. As described above, for example, should tasks and threads want to access a printer at the same time, such would not be possible. Accordingly, the task or thread with the highest priority will first start with printing. The system will then put the semaphore, which describes the status of the printer, on engaged, thereby queuing the requests of other tasks or threads. Once the system resource—the printer—is again ready, the semaphore will be reset to available. If still further requests are queued, it will now be possible to process the same. Thus, a semaphore is a special kind of counter.

Accordingly, the semaphores are used to avoid that the producer of data rewrites a memory area, in which the data are written, while the consumer of data is in the process of reading the data from this memory area. Should a simultaneous reading and writing of data occur in a multithreading operating system, one would have to expect a corruption of the data. For example, when a thread that produces data is writing in the memory a number consisting of eight bytes, the thread could be canceled after writing only a few bytes. The number having been written incompletely in the memory area would then—after changing the threads—be read and, thus, be incorrectly interpreted by the reading thread, which consumes the data. Accordingly, a reliable and uncorrupted transfer of data is possible only by a one hundred percent synchronization, even in the case of simple data types, such as a number.

While small quantities of data can be rapidly copied, synchronization will always involve the risk that the thread, which produces the data, such as, for example, a thread for controlling a process, is blocked. The blocking may last substantially longer than the mere copying action, since the thread, which consumes the data, such as a thread for visualizing the data, can in turn be blocked itself. In general, it is not possible to estimate the time, during which the thread of control is blocked. It may, however, amount to as much as a few seconds, since one has to await the release of the system resource, for example, the display. Likewise, the use of other exclusively usable system resources, such as the hard disk, voice card, interfaces, exclusively usable software modules, or the like, can also lead to a delayed response time.

A further possibility of solution is hard real time operating systems, which make available special modules that permit a nonexclusive use of system resources. While this technique considerably facilitates for a programmer the dealing with system resources, it has the disadvantage that the necessary serialization of the access to shared system resources requires first-in-first-out (FIFO) memories, which are realized in the software. In this instance, the FIFO memories function as queues. Since the system resources for a queued-up thread are never blocked, there is no possibility of making a meaningful use of this data, for example, for purposes of loading the display with additional tasks, when a step-by-step display of the data is already no longer possible. Furthermore, these specialized real time operating systems are normally not as widely distributed and standardized as universal operating system, such as, for example, Windows, Linux, or the like. The costs for training and the costs resulting from royalties or the like are therefore quite high for such real time operating systems.

It is therefore an object of the present invention to describe a method of controlling and visualizing processes of the initially described kind, which permits a deterministic behavior without increased costs for software or hardware.

SUMMARY OF THE INVENTION

In accordance with one embodiment of the present invention, the foregoing objects are accomplished by a method of controlling and visualizing processes comprising decoupling of mutually blocking tasks and/or threads in real time systems. To begin with, it has been recognized, in accordance with the invention, that it is necessary to make only minimal requests to the operating system in use, and that a satisfactory, deterministic time response will be possible without specially extending the hardware, when a decoupling of mutually blocking tasks or threads occurs. The method is equally well suited for multitasking or multithreading, since it can be universally used when system resources are available on an exclusive basis, for example, in the case of storing data on a hard disk or in the case of interactive inputs by means of an operating element, such as a mouse, a keyboard, or the like. In addition, the method is largely independent of the operating system in use, as long as this multitasking or multithreading assists and offers simple synchronization mechanisms between tasks and threads, respectively. This permits using the method of the present invention in universal operating systems, such as Windows or Linux, without resulting in additional cost for complementing hardware or software.

According to one embodiment, it is possible to control a process by means of the data producing task and/or thread, and to visualize and/or further process data by means of the data consuming task and/or thread. In another embodiment, at least the data producing task and/or thread and the data consuming task and/or thread access at least one memory area. In still another embodiment, the data producing task and/or thread and the data consuming task and/or thread deterministically access an identical memory area. Thus, when the data producing task and/or thread receives a high priority, it will be possible to enable a weak real time for the controlling process. In this instance, the data producing task and/or thread would be able to write data in the memory area upon entry into a critical program section, which can be accessed only by one task or thread, respectively. In so doing, the data producing task and/or thread could overwrite the data already present in the memory area. As another embodiment, the data producing task and/or thread may also append the data to the data already existing in the memory area. This would enable a user to select, whether all resulting data are to be visualized, or whether, in the case of too large data quantities, parts of the data are not to be visualized.

According to yet another embodiment, when entering the critical program section, the data consuming task and/or thread is able to copy the data to a further or second memory area. In addition, the data consuming task and/or thread can process the data in the further memory area. In the case that the data producing task and/or thread overwrite the data already existing in the memory area, the data producing task and/or thread will have to wait in the worst case, until the data consuming task and/or thread have copied the data to the further memory area. Otherwise, the data for the data consuming task and/or thread could be lost. In the case that data are already in the memory area, and the more recent data are appended to the same, the data consuming task and/or thread could empty the original memory area, after the data are copied to the further memory area. In this process, it is preferable to make sure that the data consuming task and/or thread lose no data when transferring the data from the original memory area to the further memory area. According to this embodiment, the only variable is the time necessary takes to assemble and copy different data packets. By means of limiting the data to a maximally allowable data packet size, it would then be possible to reach a determinism.

In still another embodiment, it is possible to write user data in the memory area by means of at least one further data producing task and/or thread. In this instance, the further data producing task and/or thread could be a surface thread of a user interface. The data, which are written in the memory area by means of the further data producing task and/or thread, could be produced by means of an operating element, preferably a mouse and/or a keyboard. In such an instance, a bi-directional data exchange would be enabled. For example, the data consuming task and/or thread could display and output the data of the process, or the data of the operating element, depending on the sequence of the actualization.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, and which are not necessarily drawn to scale, wherein:

FIG. 3 is a schematic view of a flow diagram of a further method of the present invention without a data loss.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
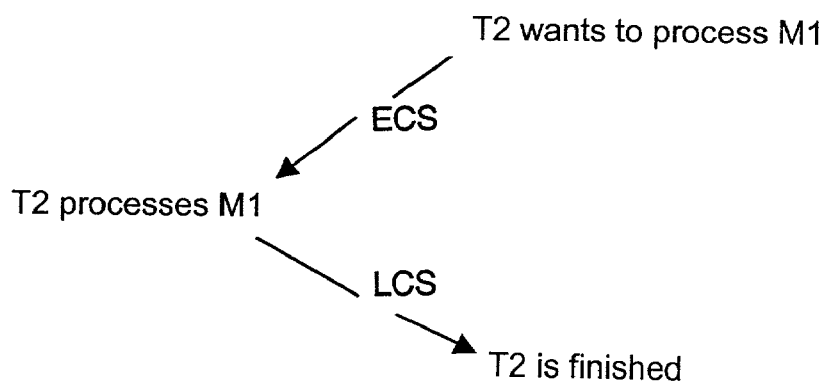
FIG. 1 is a schematic view of a flow diagram of a known method for controlling and visualizing processes.

Referring to the drawings and, in particular to FIG. 1, there is illustrated a schematic view of a flow diagram of a known method for controlling and visualizing processes, wherein the multithreading is realized on a software basis with a shared memory. Although FIG. 1 is described in terms of multithreading, this illustration is equally applicable to multiprocessing. A thread T1 produces data D and a thread T2 consumes the data D. Upon entry into a critical section ECS—enter critical section—further executions of threads are blocked, until T1 leaves the section LCS—leave critical section. Thus, the thread T1 enters critical section ECS, data D are written in a memory area M1, and thread T1 leaves the critical section LCS. The thread T2 wants to process memory area M1, but is blocked by the fact that the thread T1 operates within the critical section. Only after thread T1 has left the critical section LCS, will thread T2 be able to enter the critical section ECS and process memory area M1. As long as thread T2 processes memory area M1 and, thus, operates in the critical section, thread T1 will be blocked. Only when thread T2 has left the memory area and, thus, the critical section LCS, which also completes processing of the data in memory area M1, will thread T1 be again able to write data in memory area M1.

Contrary to the method described with reference to FIG. 1, a decoupling of the mutually blocking threads T1, T2 occurs in the embodiment of FIG. 2. By means of thread T1, a process is controlled and, consequently, the thread T1 receives a high priority. By means of thread T2, the data D are visualized. In this connection, the sequence, in which the simultaneously executing threads T1, T2 appear, is noncritical. The thread of control T1 has the data D, which are written in memory area M1, after entering critical section ECS. The thread of visualization T2 wants to process now the memory area M2. However, the thread T2 is blocked, until the thread of control T1 has left the critical section LCS. The thread of visualization T2 now enters critical section ECS, copies the data D from memory area M1 to memory area M2, and leaves the critical section LCS. The thread for visualizing T2 now processes data D, which are filed in memory area M2. In the worst case, the thread of control T1 is now blocked as long as the data D are copied from memory area M1 to memory area M2. In the case of a mere, fast visualization, such a method may be interesting for the reason that the data that are lost for the thread of visualization T2 accumulate so fast that they lie below the limit of perception of a human.

As an alternative thereto, however, it would also be possible to apply a method as shown in FIG. 3, wherein no data are lost. The thread of control T1 produces again data D, and enters the critical section ECS of a program. If the memory area M1 is empty, the data D will be written in the memory area M1. If data are still present in memory area M1, the more recent data D will be appended to these originally written data that are still present in memory area M1. The thread of control T1 leaves critical section LCS. The thread of visualization T2 wants to process the data in section M2, enters the critical section ECS, and copies the contents of memory area M1 to memory area M2. The memory area M1 is emptied, and the thread of visualization T2 leaves the critical section LCS. The thread of visualization T2 now processes the data in memory area M2, and the thread of control T1 is no longer blocked. While the determinism is thus almost as certain as in the embodiment of FIG. 2, no data loss occurs. The only variable is the time it takes to assemble and copy the different data packets of the data still present in memory area M1 and the data appended thereto. By limiting the data D to a maximally allowable data packet size, a determinism is reached. A buffering occurs in this instance by means of an adjustable buffer size.

Figure 4:
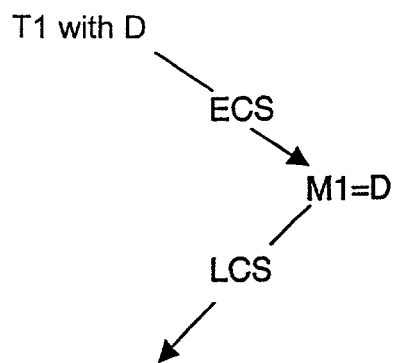
FIG. 4 is a schematic view of a flow diagram of a further method according to the present invention with a bi-directional data exchange.
Figure 4:
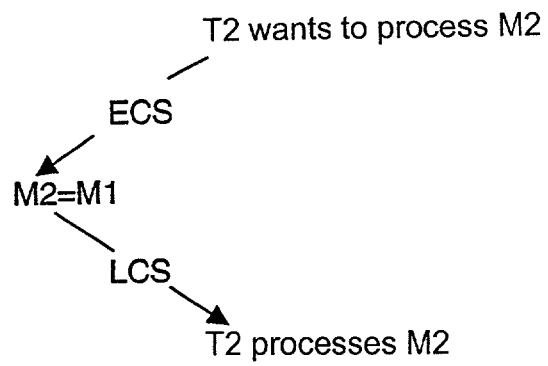
Figure 4:
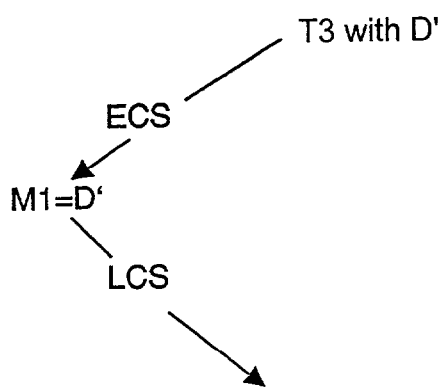

FIG. 4 illustrates a flow diagram of a method according to the invention for a bi-directional data exchange. In this embodiment, user inputs are possible by means of a further thread T3. As in the case of the embodiment of FIG. 2, the thread of control T1 enters the critical section ECS of a program, writes data D in memory area M1, and then leaves the critical section LCS. The thread of visualization T2, which has the function of processing the data in memory area M2, enters the critical section ECS, copies the contents of memory area M1 to memory area M2, leaves the critical section LCS, and processes the data in memory area M2. The further thread T3 has the function of transferring user data D' to memory area M1. The thread T3 enters the critical section ECS, and writes the data D' in memory area M1. After the thread T3 has left the critical section LCS, the thread of control T1 transfers the data D to memory area M1.

The operating element, in this instance a keyboard, does thus not block the control, and the data D or user data D' are displayed and output depending on the sequence of the actualization.

Figure 2:
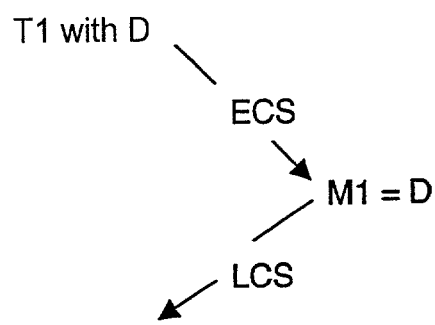
FIG. 2 is a schematic view of a flow diagram of a method according to the present invention with a data loss.
Figure 2:
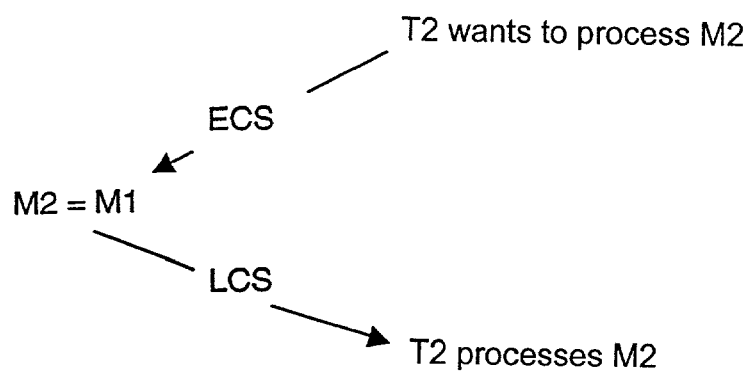

FIGS. 2–4 are block diagram, flowchart and control flow illustrations of methods, systems and program products according to the invention. It will be understood by one of skill in the art that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means or devices for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means or devices which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

As regards further details, the general description is herewith incorporated by reference for purposes of avoiding repetitions. Accordingly, blocks or steps of the block diagram, flowchart or control flow illustrations support combinations of means or devices for performing the specified functions, combinations of steps for performing the specified functions and program instruction means or devices for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Finally, it should be explicitly indicated that the above-described embodiments serve to explain merely the claimed teaching, without however limiting it to the specific embodiments. Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of controlling and visualizing processes in a real time system, having a first memory area and a second memory area, comprising:

producing data by means of at least one of a task and a thread;

writing the data in the first memory area by means of at least one of the data producing task and the data producing thread, wherein said writing step comprises storing the data into the first memory area, if the first memory area is empty, or appending the data to existing data stored in the first memory area, if the first memory area is not empty;

copying the data from the first memory area to the second memory area by means of at least one of a data consuming task and a data consuming thread prior to actual consuming of the data;

emptying the first memory area by means of the at least one of a data consuming task and a data consuming thread; and consuming the data stored in the second memory area by means of the at least one of the data consuming task and the data consuming thread, thereby decoupling mutual blocking of the at least one data producing task and data producing thread and the at least one data consuming task and data consuming thread, and permitting a deterministic time response by allowing the at least one data producing task and data producing thread to access the first memory area while the at least one data consuming task and data consuming thread accesses the second memory area.

2. A method according to claim 1, further comprising controlling a process by means of the at least one of a data producing task and a data producing thread.

3. A method according to claim 1, further comprising processing, by means of the at least one of a data consuming task and a data consuming thread, the data in the second memory area.

4. A method according to claim 3, further comprising monitoring the size of at least one of the first and second memory areas.

5. A method according to claim 3, wherein said processing step comprises visualizing the data.

6. A method according to claim 1, further comprising writing data in the first memory area by means of a second at least one of a task and a thread for producing data.

7. A method according to claim 6, wherein said writing step comprises producing the data by means of an operating element.

* * * * *